US008680730B2

(12) United States Patent
Lordo

(10) Patent No.: US 8,680,730 B2
(45) Date of Patent: Mar. 25, 2014

(54) LOW VOLTAGE HIGH HORSEPOWER BRUSHLESS MOTOR ASSEMBLY

(75) Inventor: Robert E. Lordo, Fort Mill, SC (US)

(73) Assignee: Powertec Industrial Motors, Inc., Rock Hill, SC (US)

(*) Notice: Subject to any disclaimer, the term of this patent is extended or adjusted under 35 U.S.C. 154(b) by 431 days.

(21) Appl. No.: 13/175,296

(22) Filed: Jul. 1, 2011

(65) Prior Publication Data

US 2012/0001523 A1    Jan. 5, 2012

Related U.S. Application Data

(60) Provisional application No. 61/360,517, filed on Jul. 1, 2010.

(51) Int. Cl.
*H02K 7/20* (2006.01)
(52) U.S. Cl.
USPC ............................ 310/112; 310/71; 310/68 B
(58) Field of Classification Search
USPC ............................ 310/112–114, 71, 68 B, 89
See application file for complete search history.

(56) References Cited

U.S. PATENT DOCUMENTS

| | | | | |
|---|---|---|---|---|
| 4,529,902 A * | 7/1985 | Lordo | | 310/112 |
| 6,465,924 B1 * | 10/2002 | Maejima | | 310/90.5 |
| 7,002,271 B2 * | 2/2006 | Reed et al. | | 310/71 |
| 7,834,494 B2 * | 11/2010 | Blanding et al. | | 310/68 B |
| 2005/0206253 A1 * | 9/2005 | Hertz et al. | | 310/68 B |
| 2005/0206256 A1 * | 9/2005 | Reed et al. | | 310/71 |
| 2006/0192453 A1 * | 8/2006 | Gieras et al. | | 310/92 |
| 2010/0253160 A1 * | 10/2010 | Jones et al. | | 310/43 |

* cited by examiner

*Primary Examiner* — Thanh Lam
(74) *Attorney, Agent, or Firm* — Shumaker, Loop & Kendrick, LLP

(57) ABSTRACT

A low voltage high horsepower brushless motor assembly including a plurality of axially aligned and interconnected stator module sections, a plurality of rotor modules mounted upon a common shaft corresponding to the plurality of stator module sections, and a single rotor position feedback encoder operating the motor, wherein each of the individual stator modules include multiple phase winding circuits terminating in a plurality of studs located on an exterior of their respective housings for interconnection with a plurality of controllers.

20 Claims, 4 Drawing Sheets

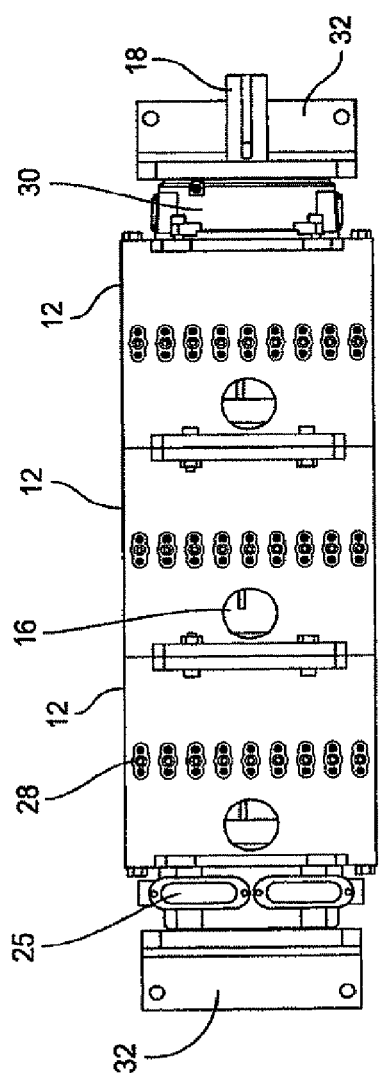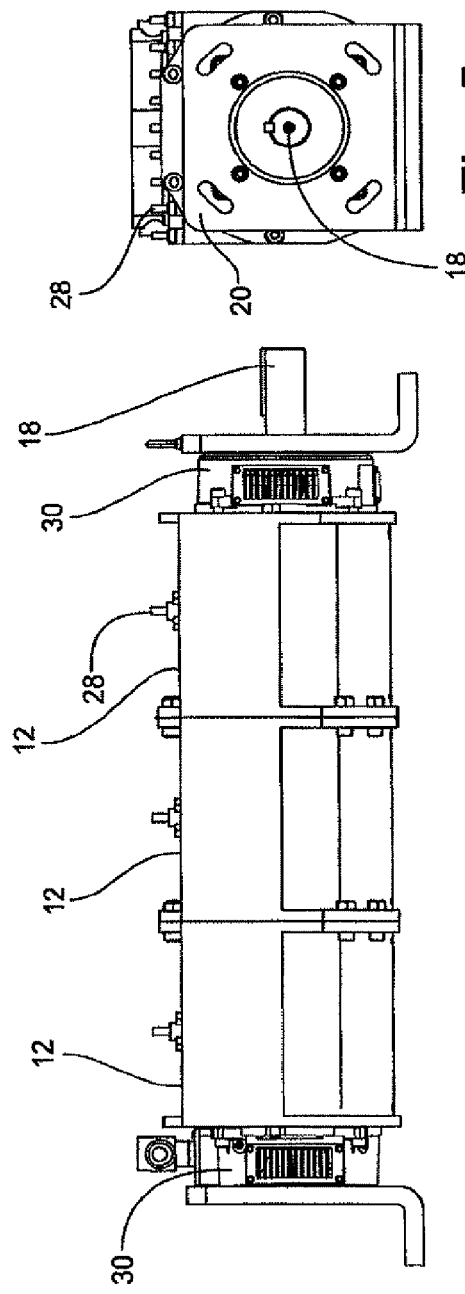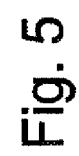

LOW VOLTAGE HIGH HORSEPOWER BRUSHLESS MOTOR ASSEMBLY

CROSS-REFERENCE TO RELATED APPLICATION

This non-provisional utility patent application claims priority to U.S. Application No. 61/360,517 filed Jul. 1, 2010, entitled "LOW VOLTAGE HIGH HORSEPOWER BRUSHLESS MOTOR ASSEMBLY," the contents of which are incorporated by reference herein.

TECHNICAL FIELD AND BACKGROUND

The present invention relates generally to the field of brushless electric motor assemblies, and more particularly, to a low voltage high horsepower motor assembly including a plurality of axially aligned and interconnected stator module sections and a plurality of corresponding rotor modules mounted upon a common shaft, such that the motor can be operated from a single rotor position feedback encoder, wherein each of the individual stator modules includes multiple three phase winding circuits terminating in a plurality of studs located on the exterior of their respective housings for interconnection with a plurality of controllers.

There is fast becoming a need for high horsepower (e.g. 20-200 hp) brushless AC and DC motors powered by low voltage (e.g. 12-96 VDC) batteries, solar cell arrays and other power sources. One major design obstacle in the production of such a motor is the extremely high phase currents required by the motor at low voltages using conventional three phase motor designs. In such conventional designs, currents can easily reach in the thousands of amps depending upon the final voltage selected. In addition to these obstacles, there are also external limitations associated with conventional motor drive controller electronics that make it difficult to design a drive to handle currents of such magnitude.

Accordingly, what is needed is a motor design that makes possible a high power level at low bus voltages that overcomes the disadvantages of the prior art designs. Such a motor is desirable for use in marine, automotive and peripheral equipment applications, among others. In particular, the low voltage characteristics of the motor provide enhanced safety in environments, such as in marine applications, where the presence of water is problematic for high voltage motors.

BRIEF SUMMARY OF THE INVENTION

In one aspect, a low voltage high horsepower brushless electric motor assembly is provided herein.

In another aspect, the motor is a brushless, permanent magnet, three phase synchronous motor.

In yet another aspect, the motor includes multiple interconnected stator and rotor modules.

In yet another aspect, the power required by each stator and rotor module is equal to the total power rating of the motor divided by the number of modules.

In yet another aspect, the stator structure of the motor is manufactured from a series of individual stator modules.

In yet another aspect, the individual stator modules are piloted and bolted together to form a single rugged and sealed main stator structure.

In yet another aspect, each of the individual stator modules are wound with multiple parallel winding sections or circuits.

In yet another aspect, the various winding sections terminate in a plurality of terminal studs located on the exterior of the stator housing.

In yet another aspect, each wound stator of the plurality of stator modules is accurately located within its respective housing, both axially and angularly, such that the motor can operate from a single rotor position feedback encoder/resolver device.

In yet another aspect, multiple rotors having substantially identical laminations and magnet assemblies are stacked onto a single, heavy-duty rotor shaft incorporating an alignment key and keyway design to ensure that all rotor core modules are in proper alignment.

In yet another aspect, the motor includes a number of motor drive controllers equal to the number of stators multiplied by the number of parallel circuits per phase to provide a manageable current capability range.

To achieve the foregoing and other aspects, a brushless motor assembly is provided herein including a plurality of axially aligned and interconnected stator module sections and a plurality of corresponding rotor modules mounted upon a common shaft, such that the motor can be operated from a single rotor position feedback encoder, wherein each of the individual stator modules includes multiple three phase winding circuits terminating in a plurality of studs located on the exterior of their respective housings for interconnection with a plurality of controllers.

Additional features, aspects and advantages of the present invention will be set forth in the detailed description which follows, and in part will be readily apparent to those skilled in the art from that description or recognized by practicing the invention as described herein.

BRIEF DESCRIPTION OF THE DRAWINGS

The present invention is better understood when the following detailed description of the invention is read with reference to the accompanying drawings, in which:

FIG. 2 is a top plan view of the motor assembly of FIG. 1 illustrating the plurality of terminal studs for connection to a plurality of controllers;

FIG. 3 is a side elevation view of the motor assembly of FIG. 1 illustrating the interconnection of the plurality of stator modules;

FIG. 5 is an end view of the motor assembly of FIG. 1; and

DETAILED DESCRIPTION OF THE INVENTION

Figure 1:
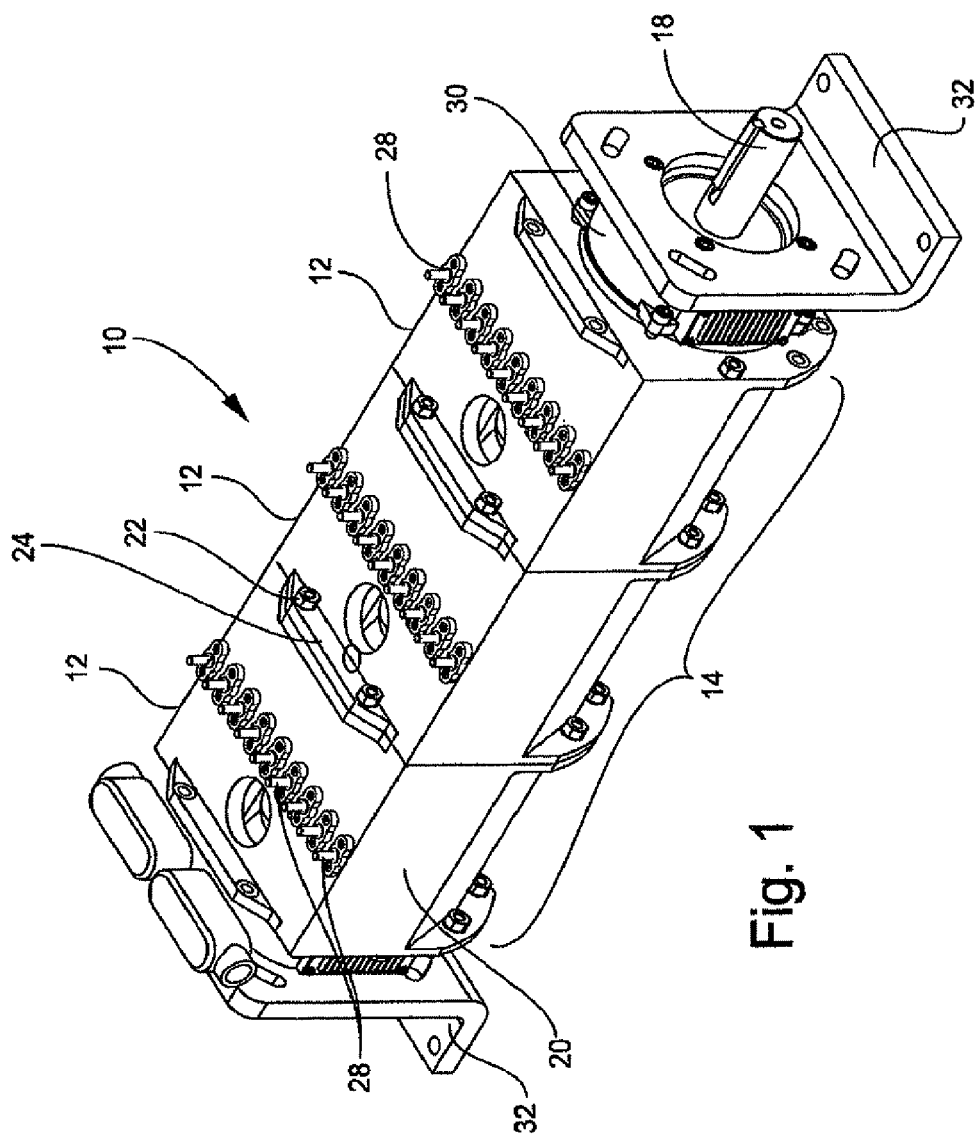
FIG. 1 is a perspective view of a brushless electric motor assembly according to a preferred embodiment of the invention.
Figure 4:
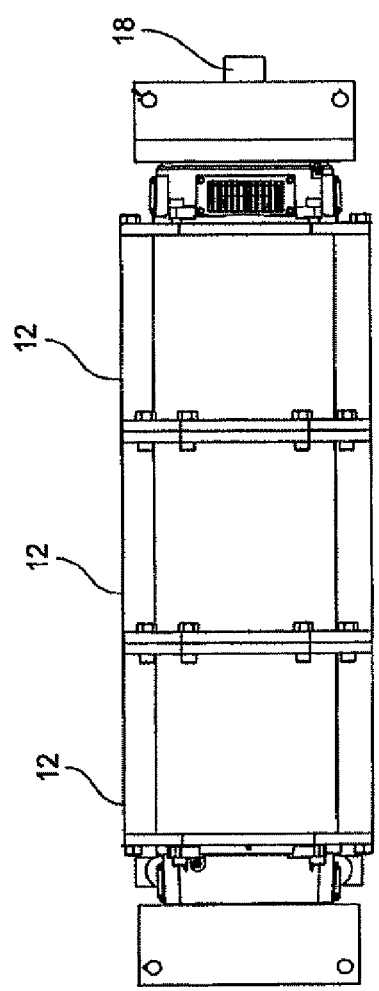
FIG. 4 is a bottom plan view of the motor assembly of FIG. 1.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

Referring to FIGS. 1-5, a preferred embodiment of a low voltage, high horsepower brushless, permanent magnet, three phase, synchronous motor assembly is shown generally at reference numeral 10. Motor assembly 10 generally includes a plurality of individual stator modules 12 interconnected to form single stator structure 14, and further includes a plurality of internally positioned, corresponding rotors 16 mounted on a common, heavy-duty shaft 18. As shown, motor assembly 10 includes three stator modules 12, however, it is envisioned that the number of stator modules may vary depending upon the required output power of the motor. In a preferred embodiment, the power required by each stator and rotor module 12 is equal to the total power rating of the motor assembly 10 divided by the number of modules 12.

Each individual stator module 12 includes a housing 20, and the multiple housings 20 are piloted and bolted together in alignment to form the single rugged and sealed main stator structure 14. The housings 20 have a predetermined shape such they are bolted together in a specific orientation, such as by a plurality of bolts 22 received through corresponding openings defined through flanges 24. Each wound stator of the plurality of stator modules 12 is accurately located within its respective housing 20, both axially and angularly, such that the motor assembly 10 can operate from a single rotor position feedback encoder/resolver device 25. Each of the individual stator modules 12 are wound with multiple parallel winding sections or circuits, as described in further detail below with reference to FIG. 6. In doing so, the stators are manufacturable using standard motor laminations and mush-wound winding techniques.

Each of the various winding sections are brought out to, or "terminate", in a plurality of terminal studs 28 located on the exterior of their respective stator housing 20. As shown, each stator module 12 terminates in nine terminal studs 28, as the novel motor assembly 10 incorporates multiple stators with multiple three phase winding circuits. Other numbers of phases are reusable, as well. The number of motor drive controllers is equal to the number of stators multiplied by the number of parallel circuits per phase such that the resulting drives are in a manageable current capability range and are easily manufacturable. Thus, in the configuration shown, nine motor drive controllers are required.

Within the stator structure 14, the corresponding number of rotors 16 have substantially identical laminations and magnet assemblies and are stacked onto the single, heavy-duty rotor shaft 18. Rotor shaft 18 preferably includes an alignment key and keyway design to ensure that all rotor core modules are in proper alignment with respect to one another and with respect to their corresponding stator module 12. Thus, the individual stator modules 12 and corresponding rotors are all mounted around common shaft 18 keyed to ensure the plurality of stator and rotor modules are precisely aligned.

Rotor shaft 18 is supported about either end by bearing assemblies 30. Motor assembly 10 further includes mounting brackets 32 positioned at opposing ends, such as mounting feet, for mounting motor assembly 10 in place. Brackets 32 define openings therethrough for receiving conventional fasteners.

Figure 6:
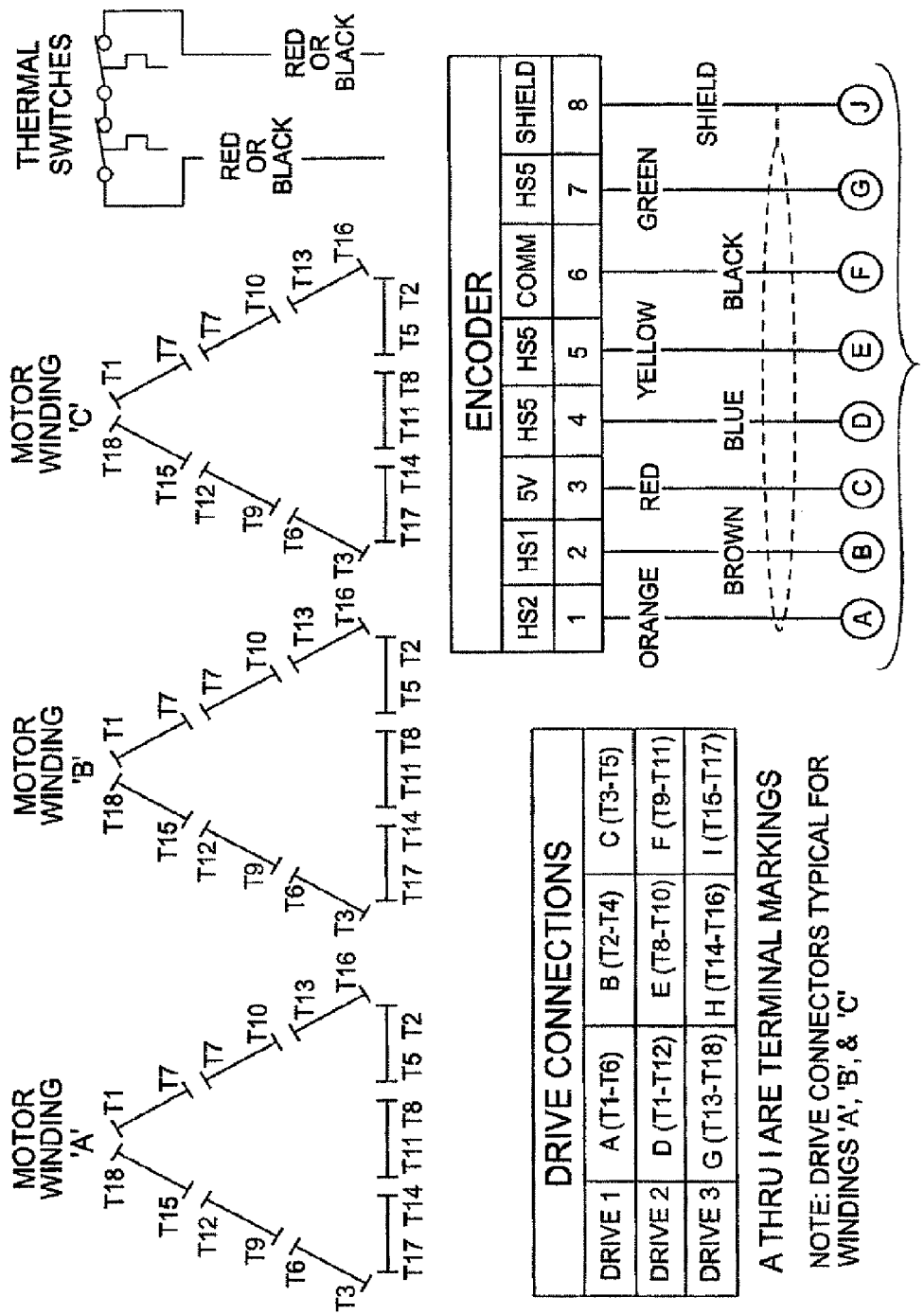
FIG. 6 is a connection diagram illustrating the drive connections for the motor assembly of FIG. 1.

Referring to FIG. 6, exemplary drive connections for motor assembly 10 are illustrated. Each stator module 12 includes three windings to provide a three phase motor, with nine drive connections per stator module 12, thus requiring nine drive controllers, The drive controllers include three phase controllers operable for taking DC from the power source (e.g. battery) and converting it to AC and applying it to the motor windings as variable voltage variable frequency current.

The delta configuration of the stators connects the three windings to each other in a triangle-like circuit as shown, and power is applied at each corner of the deltas. Motors with windings in a delta configuration typically provide low torque at low rpm, and can typically operate at a higher top rpm. The motor drive controllers are connected to the terminal studs 28 to drive the rotation of the rotors, with the rotor orientations/positions relative to the stators being determined by the single feedback encoder/resolver device. In the embodiment shown, the controllers include three bi-directional drivers to drive current, which is preferably controlled by a logic circuit. The controllers may include a microcontroller to manage acceleration, control speed and fine-tune efficiency.

In an exemplary embodiment, motor assembly 10 at about 50V produces approximately 150 Hp and approximately 315 lb-ft torque in intermittent operation at about 2500 rpm, and approximately 100 Hp and approximately 250 lb-ft torque at continuous operation at about 2100 rpm. Changes in voltage are applied through a throttle or other control device. Motor assembly 10 further includes a "limp home" feature in the event of burn out or a bad stator module 12.

Motor assembly 10 as provided herein is advantageously employed in marine, automotive and peripheral equipment applications where under 50V requirements are in place to improve safety. Specific uses for motor assembly 10 include in and around solar cells or low voltage battery applications such as traction motors and lift motors. Alternatively, motor assembly 10 may be inverted to generate power, such as for use in wind power and other applications to produce AC current.

While an electric motor assembly 10 has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A low voltage high horsepower brushless motor assembly, comprising:
    (a) a plurality of axially aligned and interconnected stator module sections;
    (b) a plurality of rotor modules mounted upon a common shaft corresponding to the plurality of stator module sections; and
    (c) a single rotor position feedback encoder operating the motor;
    wherein each of the individual stator modules include multiple phase winding circuits terminating in a plurality of studs located on an exterior of their respective housings for interconnection with a plurality of controllers.

2. The brushless motor assembly according to claim 1, wherein the plurality of individual stator modules form a single stator structure.

3. The brushless motor assembly according to claim 1, wherein the motor assembly includes multiple stator modules and multiple corresponding rotor modules.

4. The brushless motor assembly according to claim 1, wherein the power required by each stator and rotor module is equal to a total power rating of the motor assembly divided by the number of stator and rotor module pairs.

5. The brushless motor assembly according to claim 1, wherein each individual stator module includes a housing and the multiple housings are piloted and bolted together in alignment to form the single stator structure.

6. The brushless motor assembly according to claim 1, wherein each of the plurality of stator modules are located within their respective housing, both axially and angularly, such that the motor assembly can operate from the single rotor position feedback encoder.

7. The brushless motor assembly according to claim 1, wherein each stator module terminates a plurality of terminal studs dependent on the number of phases and circuits.

8. The brushless motor assembly according to claim 1, wherein the number of motor drive controllers is equal to the number of stators multiplied by the number of parallel circuits per phase.

9. The brushless motor assembly according to claim 1, wherein the motor assembly includes nine motor drive controllers.

10. The brushless motor assembly according to claim 1, wherein the rotor shaft is keyed to ensure that all rotor modules are in proper alignment with respect to one another and with respect to their corresponding stator module.

11. The brushless motor assembly according to claim 1, further comprising bearing assemblies positioned about opposing ends of the rotor assembly and mounting brackets for mounting motor assembly in place.

12. The brushless motor assembly according to claim I, wherein each of the stators comprise a delta configuration connecting its three windings to each other.

13. The brushless motor assembly according to claim 1, wherein the motor drive controllers are connected to the terminal studs to drive the rotation of the rotors, with rotor positions relative to their respective stators being determined by the single feedback encoder.

14. The brushless motor assembly according to claim 1, wherein the controllers include three bi-directional drivers to drive current.

15. The brushless motor assembly according to claim 1, wherein the motor assembly at about 50V produces about 150 Hp and about 315 lb-ft torque at interim operation at about 2500 rpm.

16. The brushless motor assembly according to claim 1, wherein the motor assembly at about 50V produces about 100 Hp and about 250 lb-ft torque at continuous operation at about 2100 rpm.

17. A low voltage high horsepower brushless motor assembly, comprising:
(a) a plurality of axially aligned and interconnected stator module sections collectively forming a single stator structure, each individual stator module including a housing, the multiple housings being piloted and bolted together in alignment to form the single stator structure;
(b) a plurality of rotor modules mounted upon a common shaft corresponding to the plurality of stator module sections such that the power required by each stator and rotor module is equal to a total power rating of the motor assembly divided by the number of stator and rotor module pairs, the plurality of stator modules being located within their respective housing, both axially and angularly, such that the motor assembly can operate from the single rotor position feedback encoder; and
(c) a single rotor position feedback encoder operating the motor;
wherein each of the individual stator modules include multiple phase winding circuits terminating in a plurality of studs located on an exterior of their respective housings for interconnection with a plurality of controllers.

18. A low voltage high horsepower brushless motor according to claim 17, wherein the motor is a marine drive motor.

19. The brushless motor assembly according to claim 17, wherein the motor drive controllers are connected to the terminal studs to drive the rotation of the rotors, with rotor positions relative to their respective stators being determined by the single feedback encoder.

20. The brushless motor assembly according to claim 17, wherein the rotor shaft is keyed to ensure that all rotor modules are in proper alignment with respect to one another and with respect to their corresponding stator module.

* * * * *